US010295376B2

(12) United States Patent
Narasimhan

(10) Patent No.: US 10,295,376 B2
(45) Date of Patent: May 21, 2019

(54) MULTI-TURN ANGLE POSITION SENSOR (EXTENDIBLE FOR MORE THAN 10 TURNS)

(71) Applicant: Honeywell International Inc., Morris Plains, NJ (US)

(72) Inventor: Kumaran Sena Narasimhan, Bangalore (IN)

(73) Assignee: Honeywell International Inc., Morris Plains, NJ (US)

( * ) Notice: Subject to any disclaimer, the term of this patent is extended or adjusted under 35 U.S.C. 154(b) by 115 days.

(21) Appl. No.: 15/265,091

(22) Filed: Sep. 14, 2016

(65) Prior Publication Data

US 2017/0082462 A1    Mar. 23, 2017

(30) Foreign Application Priority Data

Sep. 18, 2015 (IN) .......................... 2958/DEL/2015

(51) Int. Cl.
*G01D 5/245*    (2006.01)
*G01B 7/30*    (2006.01)
(Continued)

(52) U.S. Cl.
CPC ............ *G01D 5/2455* (2013.01); *G01B 7/30* (2013.01); *G01D 5/06* (2013.01); *G01D 5/145* (2013.01); *G01D 5/2452* (2013.01)

(58) Field of Classification Search
CPC ........ G01D 5/2455; G01D 5/145; G01D 5/06; G01D 5/2452; G01B 7/30
See application file for complete search history.

(56) References Cited

U.S. PATENT DOCUMENTS 6,049,152 A * 4/2000 Nakano ................ H02K 11/048
                                                   310/114
9,421,311 B2 * 8/2016 Tanner ................ A61M 1/1036
(Continued)

FOREIGN PATENT DOCUMENTS

| CN | 203819335 U | 9/2014 |
| GB | 2543925 A | 5/2017 |
| JP | 2010185828 A | 8/2010 |

OTHER PUBLICATIONS

Combined Search and Examination Report; United Kingdom Patent Application No. 1615708.3; dated Feb. 24, 2017; 6 pages.
(Continued)

*Primary Examiner* — Huy Q Phan
*Assistant Examiner* — Zannatul Ferdous
(74) *Attorney, Agent, or Firm* — Craige Thompson; Thompson Patent Law

(57) ABSTRACT

A multi-turn non-contact sensor includes a rotationally mounted driver magnet, and a rotationally mounted driven magnet. The driver magnet has a first number ($P_1$) of magnetic poles and is configured to selectively receive a rotational drive torque and, upon receipt of the drive torque, to rotate about a first rotational axis. The driven magnet is spaced apart from, and is coupled to receive a magnetic force from, the driver magnet. The driven magnet has a second number ($P_2$) of magnetic poles and is responsive to rotation of the driver magnet to rotate about a second rotational axis that is parallel to the first rotational axis. The driven magnet rotates one complete revolution each time the driver magnet rotates a predetermined number (N) of complete revolutions, $P_2 > P_1$, and $N = (P_2/P_1)$.

20 Claims, 9 Drawing Sheets

(51) Int. Cl.
  *G01D 5/06* (2006.01)
  *G01D 5/14* (2006.01)

(56) References Cited

U.S. PATENT DOCUMENTS

| | | | |
|---|---|---|---|
| 2005/0206260 A1* | 9/2005 | Akiyama | C30B 15/30 |
| | | | 310/104 |
| 2009/0140731 A1 | 6/2009 | Miyashita et al. | |
| 2011/0031837 A1* | 2/2011 | Kuritani | F04C 15/0069 |
| | | | 310/103 |

OTHER PUBLICATIONS

Office Action; China Patent Application No. 201621331456.7; dated Feb. 27, 2017; 7 pages.

* cited by examiner

MULTI-TURN ANGLE POSITION SENSOR (EXTENDIBLE FOR MORE THAN 10 TURNS)

CROSS-REFERENCE TO RELATED APPLICATIONS

This application claims priority to foreign Indian Provisional Patent Application Serial No. 2958/DEL/2015, filed on Sep. 18, 2015 with the Government of India Patent Office and entitled "Multiturn Angie Position Sensor (Extendible for More Than 10 Turns)", which is incorporated herein by reference in its entirety.

TECHNICAL FIELD

The present invention generally relates to sensors, and more particularly relates to a multi-turn non-contact sensor.

BACKGROUND

Sensors are used in myriad devices and systems to sense angular (e.g., rotational) position. In some instances, there is a need to sense multi-turn (e.g., >360-degrees) angular positions of a device. Many devices within the automotive and various other vehicular transport industries, the healthcare industry, industrial automation and control industries, and the toy and recreational device industries, just to name a few, have such needs. Some examples of particular devices within some of these industries include steering wheels, stability controls, patient platform positioning, synchronized robots, and industrial valves. With many of these devices, may be desirable to sense, for example, ±720-degrees or more of rotation. This requires a sensor with a minimum sensing range of at least 1440-degrees. Unfortunately, few multi-turn sensors with a minimum sensing range of at least 1440-degrees, and that exhibit adequate reliability, stability, and accuracy are presently available.

Hence, there is a need for a multi-turn sensor that can at least provide a sensing range of 1440-degrees or more, and that exhibits adequate reliability, stability, and accuracy are presently available. The present invention addresses at least this need.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In one embodiment, a multi-turn non-contact sensor includes a rotationally mounted driver magnet, and a rotationally mounted driven magnet. The driver magnet has a first number ($P_1$) of magnetic poles and is configured to selectively receive a rotational drive torque and, upon receipt of the drive torque, to rotate about a first rotational axis. The driven magnet is spaced apart from, and is coupled to receive a magnetic force from, the driver magnet. The driven magnet has a second number ($P_2$) of magnetic poles and is responsive to rotation of the driver magnet to rotate about a second rotational axis that is parallel to the first rotational axis. The driven magnet rotates one complete revolution each time the driver magnet rotates a predetermined number (N) of complete revolutions, $P_2>P_1$, and $N=(P_2/P_1)$.

In another embodiment, a multi-turn non-contact sensor includes a rotationally mounted driver magnet, a rotationally mounted driven magnet, a driven magnet sensor, and an output circuit. The driver magnet has a first number ($P_1$) of magnetic poles and is configured to selectively receive a rotational drive torque and, upon receipt of the drive torque, to rotate about a first rotational axis to a rotational position. The driven magnet is spaced apart from, and is coupled to receive a magnetic force from, the driver magnet. The driven magnet has a second number ($P^2$) of magnetic poles and is responsive to rotation of the driver magnet to rotate about a second rotational axis that is parallel to the first rotational axis. The driven magnet sensor is spaced apart from the driven magnet, and is configured to sense rotation of the driven magnet and supply a driven magnet sensor output signal representative thereof. The output circuit is coupled to receive the sensor output signal from the magnetic sensor and is configured, upon receipt thereof, to determine one or both of (i) absolute angular position of the driven magnet and (ii) rotational speed of the driven magnet. The driven magnet rotates one complete revolution each time the driver magnet rotates a predetermined number (N) of complete revolutions, $P_2>P_1$, and $N=(P_2/P_1)$.

In yet another embodiment, a multi-turn non-contact sensor includes a rotationally mounted driver shaft, a rotationally mounted driven shaft, a driver magnet, a driven magnet, a driven magnetic sensor, and an output circuit. The driver shaft is configured to selectively receive a rotational drive torque and, upon receipt of the drive torque, to rotate about a first rotational axis to a rotational position. The driven shaft is spaced apart from the driver shaft and is configured to rotate about a second rotational axis that is parallel to the first rotational axis. The driver magnet is mounted on the driver shaft to rotate therewith, and has a first number ($P_1$) of magnetic poles. The driven magnet is mounted on the driven shaft and is coupled to receive a magnetic force from the driver magnet. The driven magnet has a second number ($P_2$) of magnetic poles, and is responsive to rotation of the driver magnet to cause the driven shaft to rotate about the second rotational axis. The driven magnet sensor is spaced apart from the driven magnet, and is configured to sense rotation of the driven magnet and supply a driven magnet sensor output signal representative thereof. The output circuit is coupled to receive the sensor output signal from the magnetic sensor and is configured, upon receipt thereof, to determine one or both of (i) absolute angular position of the driven magnet and (ii) rotational speed of the driven magnet. The driven magnet rotates one complete revolution each time the driver magnet rotates a predetermined number (N) of complete revolutions, $P_2>P_1$, and $N=(P_2/P_1)$.

Furthermore, other desirable features and characteristics of the sensor will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
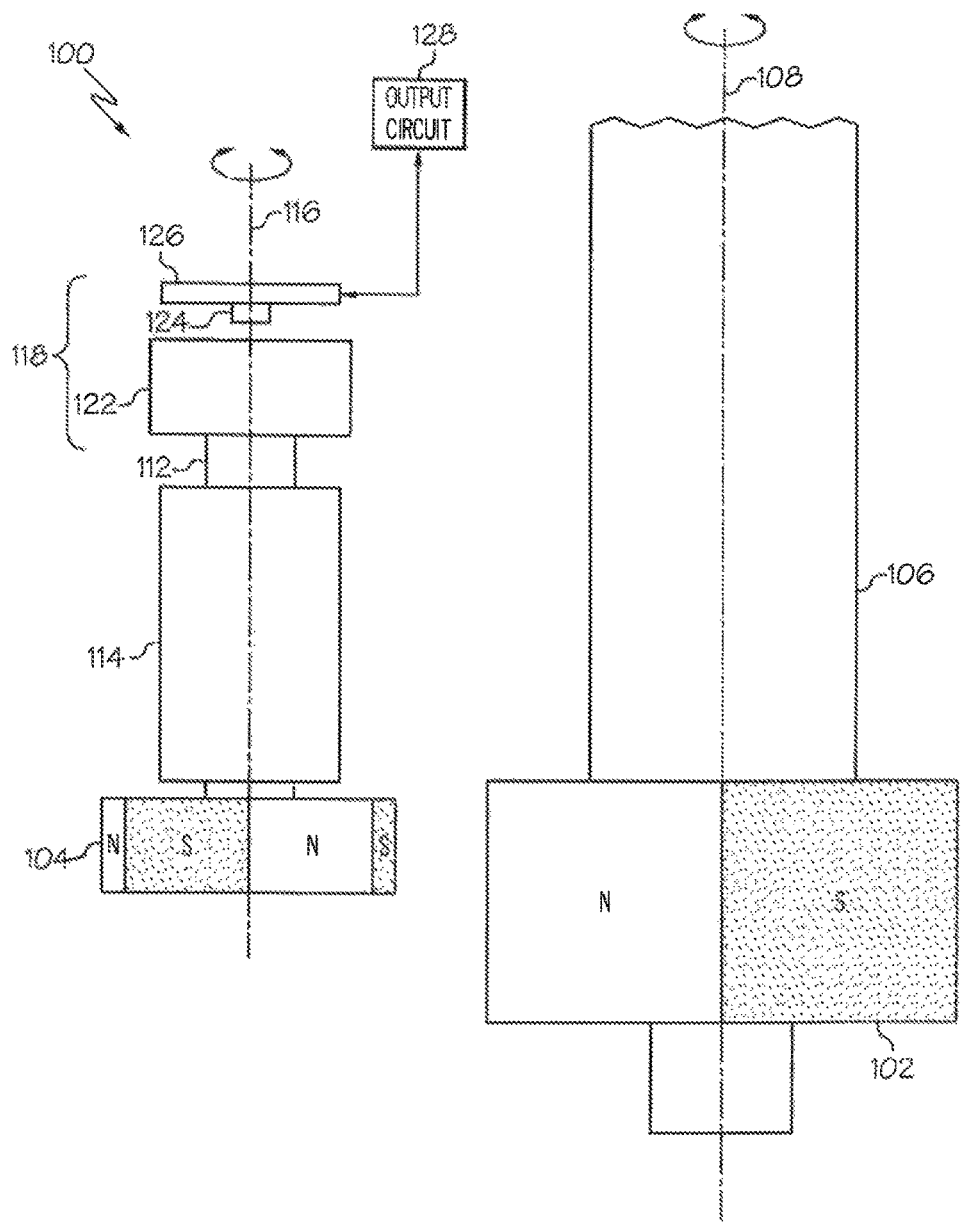
FIG. 1 depicts a side view of one embodiment of a multi-turn non-contact sensor.

Referring to FIG. 1, a conceptual side view of one embodiment of a multi-turn non-contact sensor 100 is depicted and includes a driver magnet 102 and a driven magnet 104. The driver magnet 102 is rotationally mounted and is configured to selectively receive a rotational drive torque. In the depicted embodiment, the driver magnet 102 is mounted on a driver shaft 106, and receives the drive torque the from a non-illustrated torque source via the driver shaft 106. The driver magnet 102, upon receipt of the drive torque, rotates about a first rotational axis 108. The driver magnet 102 has a first number ($P_1$) of magnetic poles. It will be appreciated that the first number ($P_1$) of magnetic poles may vary, but in the depicted embodiment the first number ($P_1$) is 2 (e.g., $P_1=2$).

The driven magnet 104 is also rotationally mounted. In the depicted embodiment the driven magnet 104 is mounted on a driven shaft 112, which is rotationally mounted via, for example, a bearing 114. The rotationally mounted driven magnet 104 is spaced apart from the driver magnet 102, but is in sufficient proximity to receive a magnetic force from the driver magnet 102. Thus, the driven magnet 104 is responsive to the rotation of the driver magnet 102 to rotate about a second rotational axis 116 that is parallel to the first rotational axis 108. The driven magnet 102 has a second number ($P_2$) of magnetic poles, where the second number ($P_2$) of magnet poles is greater than the first number ($P_1$) of magnet poles. As with the driver magnet 102, it will be appreciated that the second number ($P_2$) of magnetic poles may vary. In the depicted embodiment, the second number ($P_2$) of magnetic poles is 6, but it could be more or less than this number.

No matter the specific number of poles (P) that the driver and driven magnets 102, 104 have, it will be appreciated that first and second numbers ($P_1$, $P_2$) of magnet poles are selected such that the driven magnet 104 will rotate one complete revolution each time the driver magnet 102 rotates a predetermined number (N) of turns. More specifically, the relationship of the predetermined number of complete revolutions (N) that the driver magnet 102 will rotate to cause the driven magnet 104 to rotate one complete revolution is given by $N=(P_2/P_1)$.

Thus, for example, if the first number ($P_1$) of magnetic poles is 2 ($P_1=2$), and the second number ($P_2$) of magnetic poles is 6 ($P_2=6$), then the driven magnet 104 will rotate one complete revolution each, time the driver magnet 102 rotates 3 complete revolutions (N=3); if the first number ($P_1$) of magnetic poles is 2 ($P_1=2$), and the second number ($P_2$) of magnetic poles is 8 ($P_2=8$), then the driven magnet 104 will rotate one complete revolution each time the driver magnet 102 rotates 4 complete revolutions (N=4); if the first number ($P_1$) of magnetic poles is 2 ($P_1=2$), and the second number ($P_2$) of magnetic poles is 16 ($P_2=16$), then the driven magnet 104 will rotate one complete revolution each time the driver magnet 102 rotates 8 complete revolutions (N=8); and so on.

As FIG. 1 also depicts, the multi-turn non-contact sensor 100 additionally includes a driven magnet sensor 118. The driven magnet sensor 118 is spaced apart from the driven magnet 104 and is configured to sense the rotation of the driven magnet 104, and to supply a driven magnet sensor output signal representative thereof. It will be appreciated that the driven magnet sensor 118 may be variously configured and implemented to carry out this function. In the depicted embodiment, however, it is implemented using a driven sensor magnet 122 and a magnetic sensor 124. The driven sensor magnet 122, which may be a fixed dipole magnet, is spaced apart from, and coupled to, the driven magnet 104 to rotate therewith. In the depicted embodiment, the driven sensor magnet 122 is mounted on the driven shaft 112.

The magnetic sensor 124 is disposed adjacent to the driven sensor magnet 122, The magnetic sensor 124 is configured to sense rotations of the driven sensor magnet 122 and, in response to these rotations, to supply the driven magnet sensor output signal. It will be appreciated that the magnetic sensor 124 may be variously configured and implemented. In the depicted embodiment, however, it is implemented using a Hall sensor that is mounted on a circuit board 126 that is spaced apart from the driven sensor magnet 122.

Regardless how the driven magnet sensor 118 is specifically implemented, the driven magnet sensor output signal is supplied to an output circuit 128. The output circuit 128 is configured, upon receipt of the driven magnet sensor output signal, to determine the absolute angular position of the driver magnet 102, and thus the driver shaft 106 and any component(s) coupled to the driver shaft 106.

Figure 2:
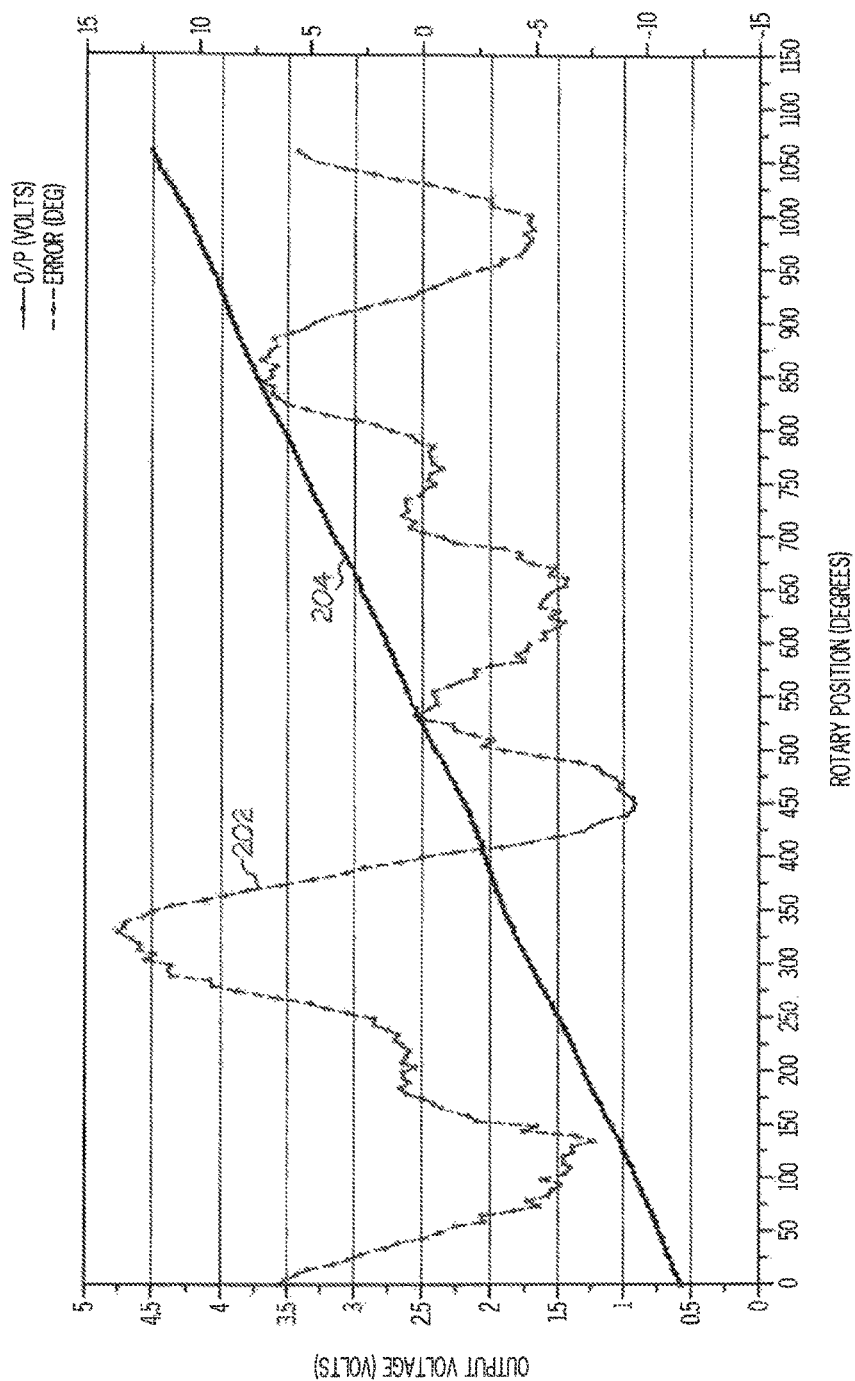
FIG. 2 depicts the linearity error in the output of the multi-turn non-contact sensor of FIG. 1 when it is implemented with a 6-pole driven magnet.
Figure 3:
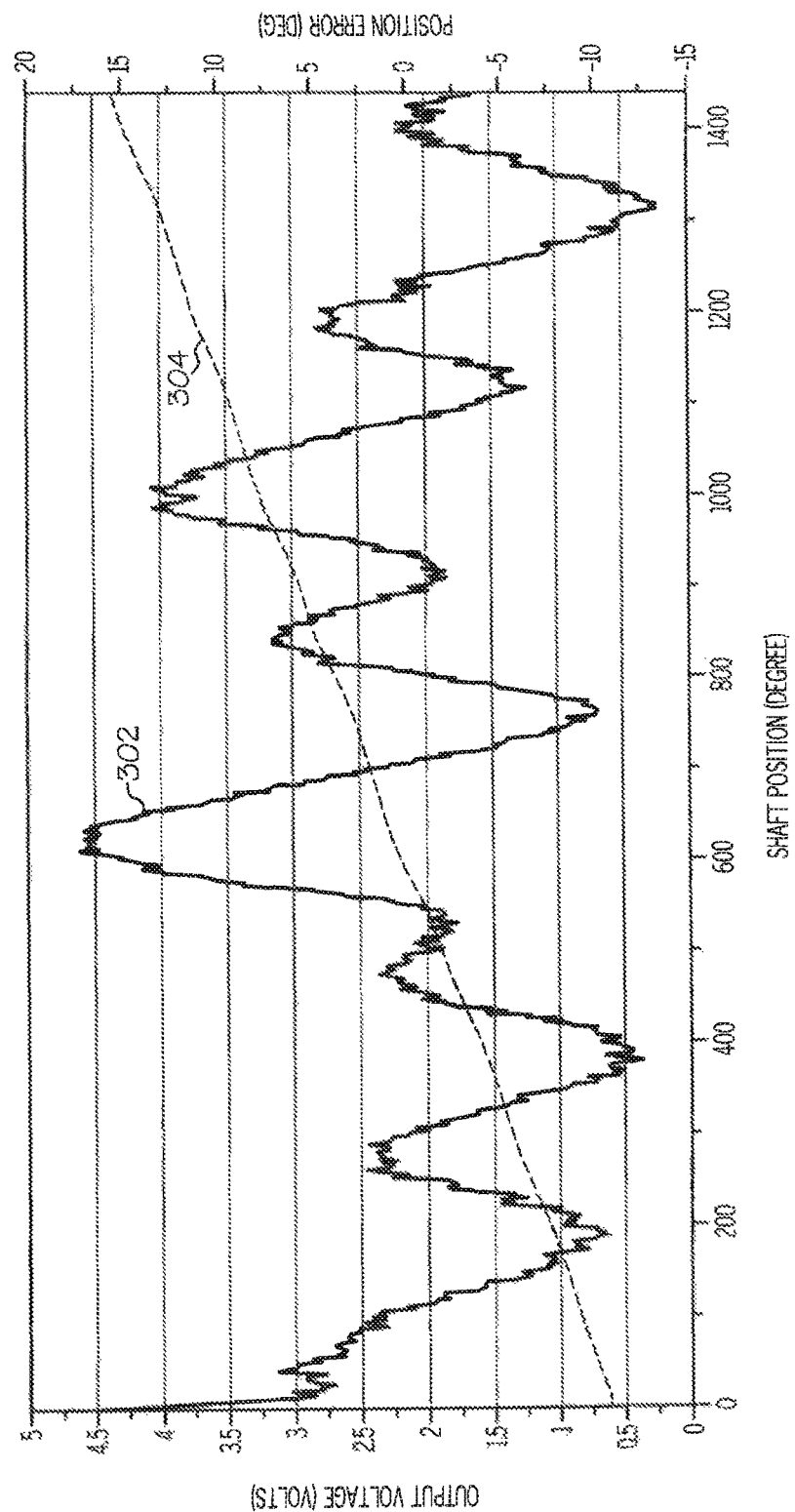
FIG. 3 depicts the linearity error in the output of the multi-turn non-contact sensor of FIG. 1 when it is implemented with an 8-pole driven magnet.

The multi-turn non-contact sensor 100 depicted in FIG. 1 and described above provides multi-turn angular position sensing capability, in non-contact fashion, and with suitable accuracy. Indeed, FIG. 2 depicts the linearity error 202 in the output 204 of the multi-turn non-contact sensor 100 when implemented with a 6-pole (e.g., $P_2=6$) driven magnet 104 that was driven through 3 complete revolutions (e.g., 1080-degrees), and FIG. 3 depicts the linearity error 302 in the output 304 of the multi-turn non-contact sensor 100 when implemented with an 8-pole (e.g., $P_2=8$) driven magnet 104 that was driven through 4 complete revolutions (e.g., ±720-degrees). The maximum linearity error 202 in FIG. 2 is about 1.1% of full-scale, and the maximum linearity error 302 in FIG. 3 was about 1.19% of full-scale.

Figure 4:
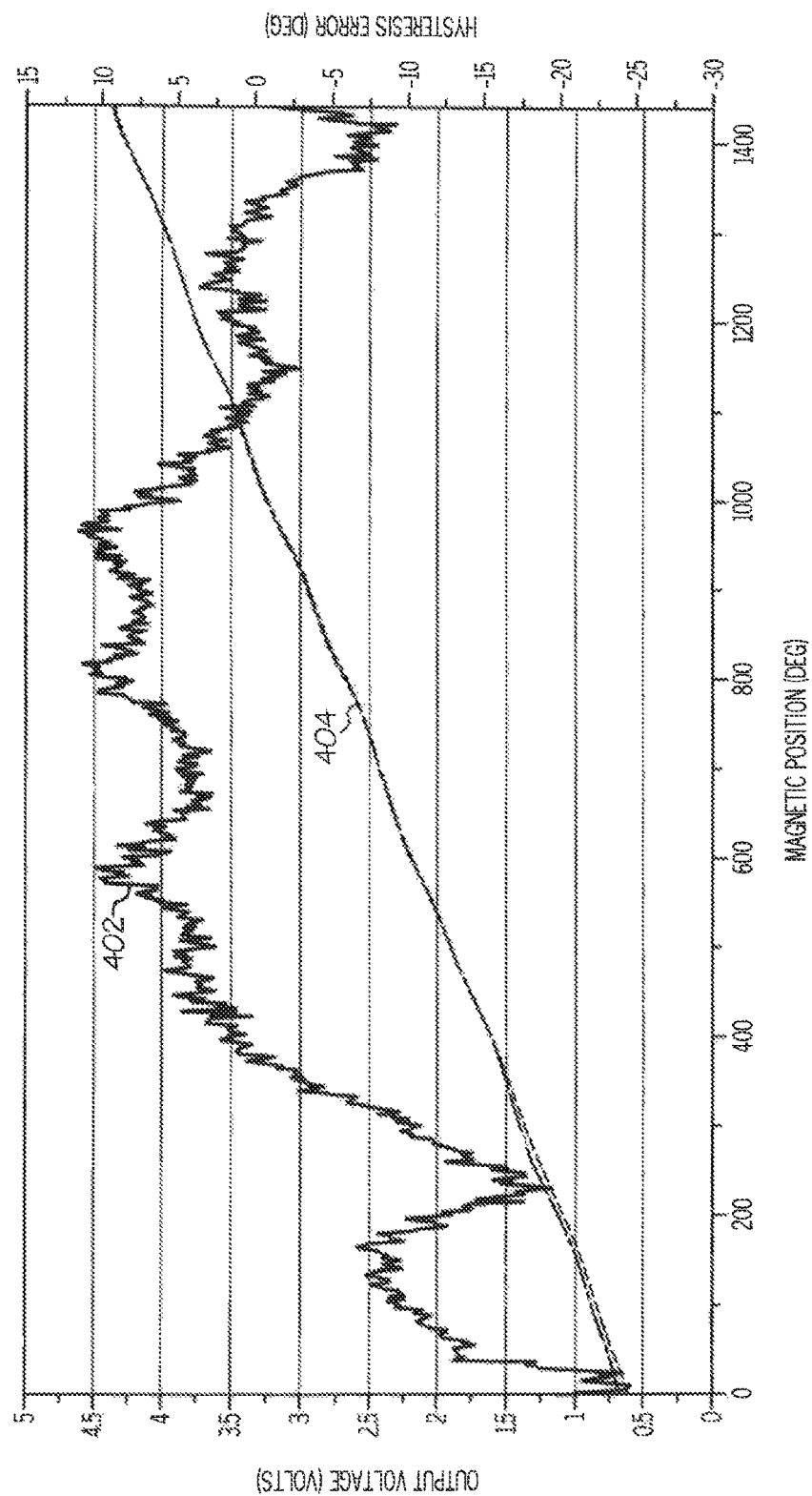
FIG. 4 depicts the hysteresis error in the output of the multi-turn non-contact sensor of FIG. 1 when it is implemented with an 8-pole driven magnet.
Figure 5:
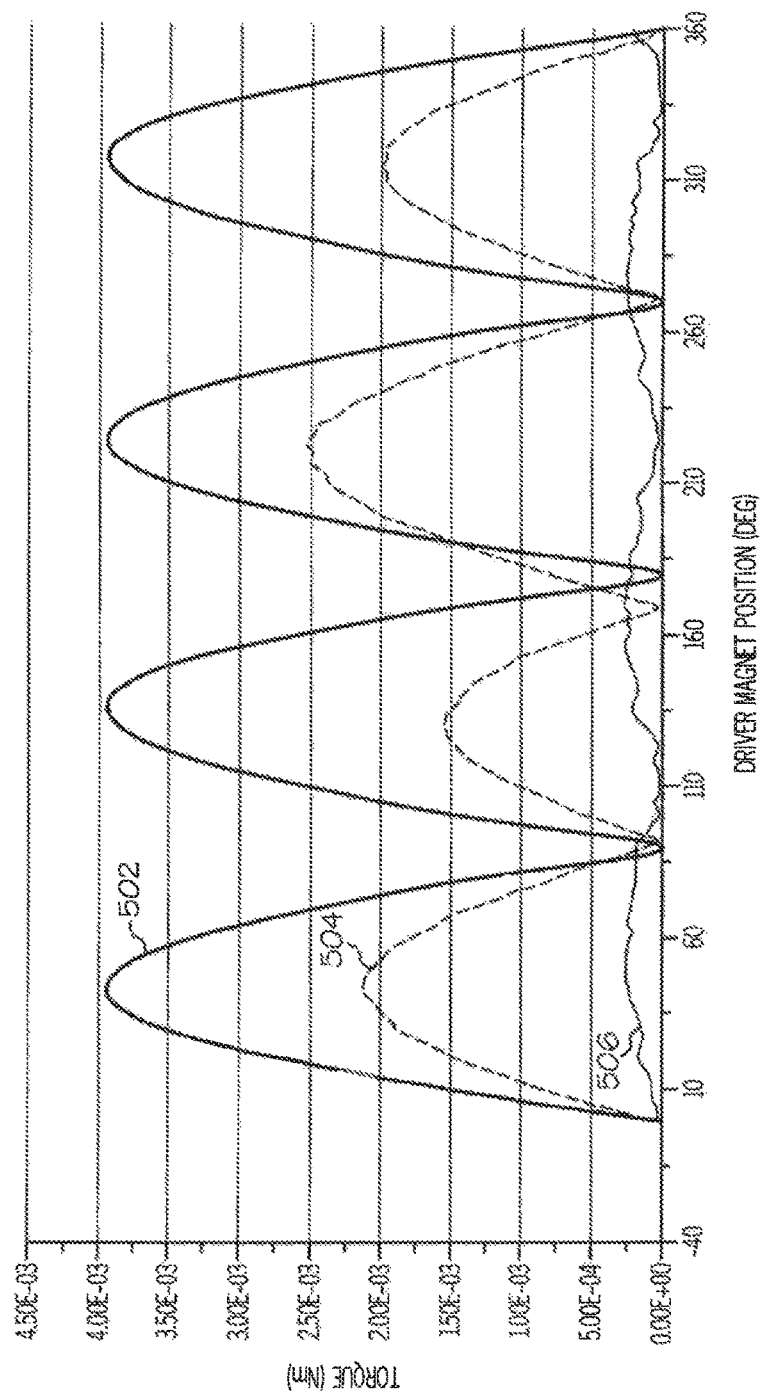
FIG. 5 depicts the torque that is developed in the multi-turn non-contact sensor of FIG. 1 when it is implemented with a 6-pole, 8-pole, and 16-pole driven magnet.

For completeness, FIGS. 4 and 5 are also provided, FIG. 4 depicts the hysteresis error 402 in the output 404 of the multi-turn non-contact sensor 100 that is implemented with the 8-pole (e.g., $P_2$=8) driven magnet 104 and that was driven through 4 complete revolutions (e.g., ±720-degrees). FIG. 5 depicts the torque that is developed to rotate the driver magnet 104 through one complete rotation (e.g., 360-degrees) when the driver magnet 104 in the multi-turn non-contact sensor 100 of FIG. 1 is implemented with a 6-pole 502, 8-pole 504, and 16-pole 506 magnet.

The accuracy of the multi-turn non-contact sensor 100 depicted in FIG. 1 and described above can be improved by including an additional sensor. In particular, and with reference now to FIGS. 6 and 7, multi-turn non-contact sensor 100 depicted therein is substantially identical to the one depicted in FIG. 1, but additionally includes a driver magnet sensor 602. The driver magnetic sensor 602 is spaced apart from the driver magnet 102 and is configured to sense the rotation of the driver magnet 102, and to supply a driver magnet sensor output signal representative thereof to the output circuit 128. It will be appreciated that the driver magnet sensor 128 may be variously configured and implemented to carry out this function. In the depicted embodiment, however, it is implemented using a driver sensor magnet 604 and a second magnetic sensor 606. The driver sensor magnet 604, which may be a fixed dipole magnet, is spaced apart from, and coupled to, the driver magnet 102 to rotate therewith. In the depicted embodiment, the driver sensor magnet 604 is mounted on the driver shaft 106.

The second magnetic sensor 606 is disposed adjacent to the driver sensor magnet 604. The second magnetic sensor 606 is configured to sense rotations of the driver sensor magnet 604 and, in response to these rotations, to supply the driver magnet sensor output signal to the output circuit 128. It will be appreciated that the second magnetic sensor 606 may be variously configured and implemented. In the depicted embodiment, however, it is implemented using an array of anisotropic magnetic resistors (AMRs) that are mounted on a common circuit board 126 as the driver magnet magnetic sensor 124.

Figure 6:
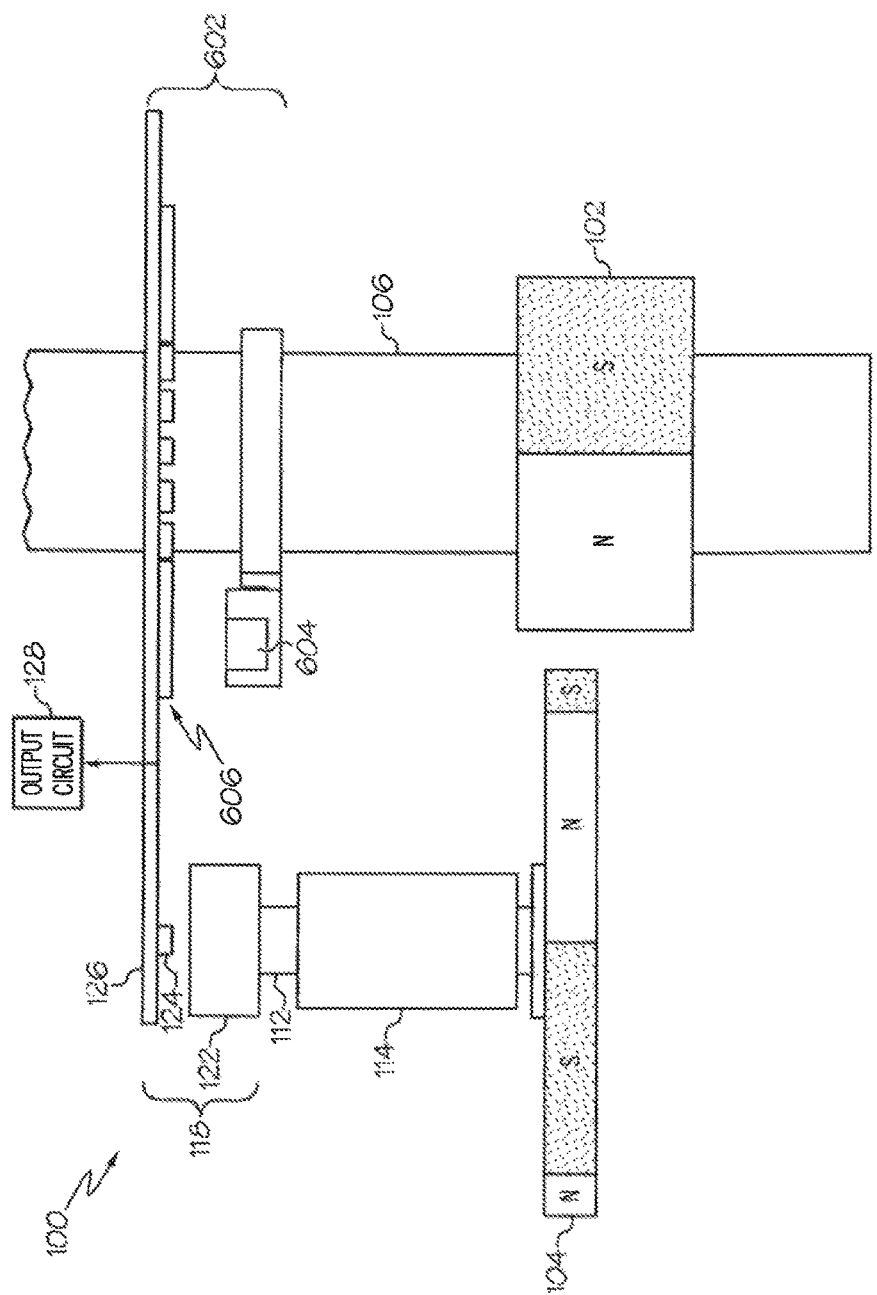
FIGS. 6 and 7 depict side and plan views, respectively, of another embodiment of a multi-turn non-contact sensor.
Figure 7:
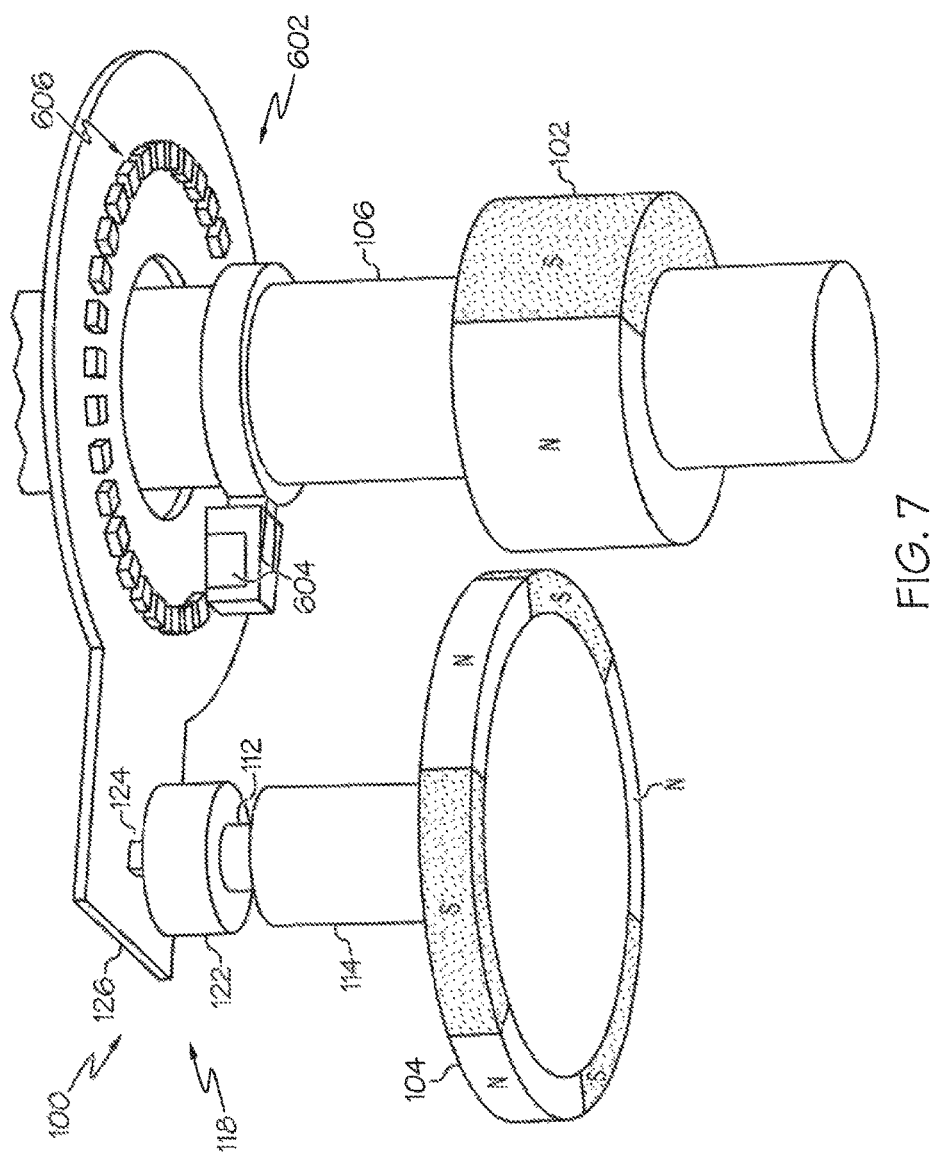
Figure 8A:
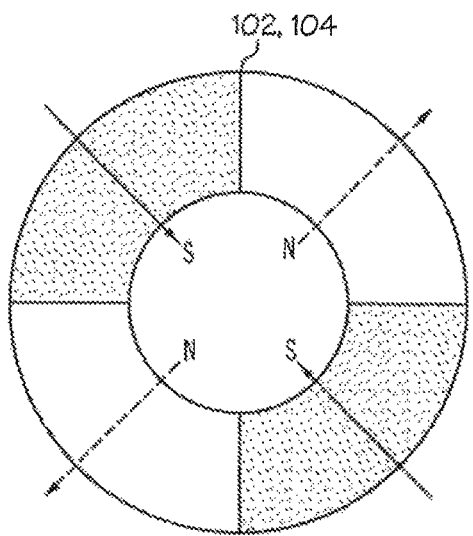
FIGS. 8A and 8B and 9A and 9B depict different configurations of the driver and driven magnets of the multi-turn non-contact sensors of FIGS. 1, 6, and 7.
Figure 8B:
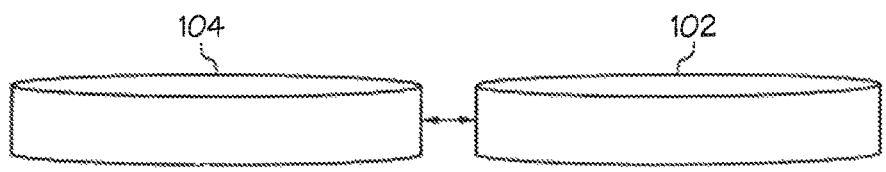
Figure 9A:
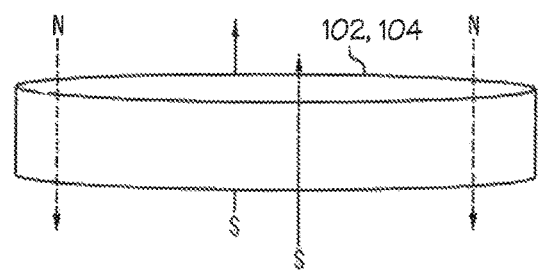
Figure 9B:
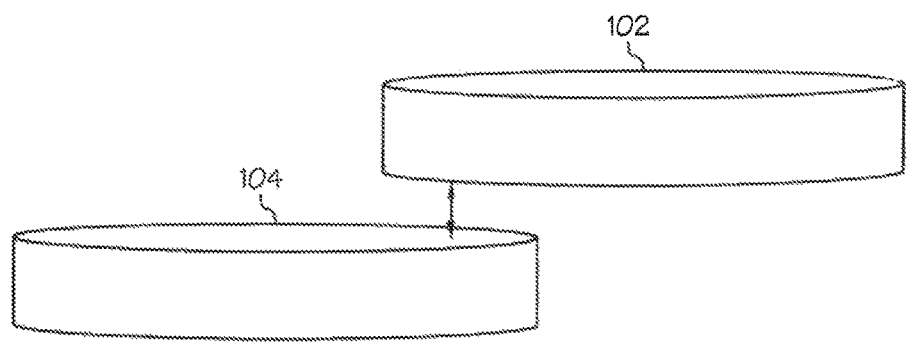

It is noted that in the multi-turn no-contact sensors 100 depicted in FIGS. 1, 6, and 7 the driver magnet 102 and driven magnet 104 are configured and disposed such that the magnetic coupling between these magnets 102, 104 is radial. This configuration shown more clearly in FIG. 8. It will be appreciated that this is merely exemplary of one particular configuration, and that other configurations, and thus the magnetic coupling between these magnets 102, 104, may be implemented. For example, as FIG. 9 depicts, the driver magnet 102 and driven magnet 104 may be configured and disposed such that the magnetic coupling between these magnets 102, 104 is axial.

The multi-turn no-contact sensors described herein provide a minimum sensing range of 1440-degrees, and exhibit relatively good reliability, stability, and accuracy. It should be noted, however, that the sensors can additionally, or instead, be configured to sense rotational speed. For example, the sensors can be used to accurately measure rotational speed in applications where there are limitations in the electronics. The rotational speed can be controlled to either increase or decrease rotational speed, as needed or desired.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A multi-turn non-contact sensor, comprising:
a rotationally mounted driver magnet configured to selectively receive a rotational drive torque and, upon receipt of the drive torque, to rotate about a first rotational axis, the driver magnet having a first number (P1) of magnetic poles; and
a rotationally mounted driven magnet spaced apart from, and coupled to receive a magnetic force from, the driver magnet, the driven magnet having a second number (P2) of magnetic poles, the driven magnet responsive to rotation of the driver magnet to rotate about a second rotational axis that is parallel to the first rotational axis,
wherein the driver magnet is axially spaced from the driven magnet with a partial axial overlap between the driver magnet and the driven magnet such that a magnetic coupling between the driver magnet and the driven magnet is an axial coupling that is substantially parallel to the first rotational axis,
wherein the first rotational axis is different from the second rotational axis and the first rotational axis is radially spaced apart from the second rotational axis, such that the first rotational axis is not coaxially aligned with the second rotational axis,
wherein the driven magnet rotates one complete revolution each time the driver magnet rotates a predetermined number (N) of complete revolutions, $P2>P1$, and $N=(P2/P1)$.

2. The sensor of claim 1, further comprising:
a driven magnet sensor spaced apart from the driven magnet, the driven magnet sensor configured to sense rotation of the driven magnet and supply a driven magnet sensor output signal representative thereof.

3. The sensor of claim 2, wherein the driven magnet sensor comprises:

a driven sensor magnet spaced apart from, and coupled to, the driven magnet to rotate therewith; and
a magnetic sensor disposed adjacent to the driven sensor magnet, the magnetic sensor configured to sense rotation of the driven sensor magnet and, in response thereto, to supply the driven magnet sensor output signal.

4. The sensor of claim 2, further comprising:
an output circuit coupled to receive the driven magnet sensor output signal and configured, upon receipt thereof, to determine absolute angular position of the driver magnet.

5. The sensor of claim 2, further comprising:
a driver magnet sensor spaced apart from the driver magnet, the driver magnet sensor configured to sense rotation of the driver magnet and supply a driver magnet sensor output signal representative thereof.

6. The sensor of claim 5, further comprising:
an output circuit coupled to receive the driven magnet sensor output signal and the driver magnet sensor output signal, the output circuit configured, upon receipt of these signals, to determine absolute angular position of the driver magnet.

7. The sensor of claim 5, wherein the driver magnet sensor comprises:
a driver sensor magnet spaced apart from, and coupled to, the driver magnet to rotate therewith; and
a magnetic sensor disposed adjacent to the driver sensor magnet, the magnetic sensor configured to sense rotation of the driver sensor magnet and, in response thereto, to supply the driver magnet sensor output signal.

8. The sensor of claim 1, further comprising:
a driver shaft coupled to the driver magnet and configured to rotate the driver magnet multiple complete rotations about the first rotational axis.

9. The sensor of claim 8, further comprising:
a driven shaft coupled to the driven magnet and configured to rota with the driven magnet, about the second rotational axis.

10. A multi-turn non-contact sensor, comprising:
a rotationally mounted driver magnet configured to selectively receive a rotational drive torque and, upon receipt of the drive torque, to rotate about a first rotational axis to a rotational position, the driver magnet having a first number (P1) of magnetic poles;
a rotationally mounted driven magnet spaced apart from, and coupled to receive a magnetic force from, the driver magnet, the driven magnet having a second number (P2) of magnetic poles, the driven magnet responsive to rotation of the driver magnet to rotate about a second rotational axis that is parallel to the first rotational axis;
a driven magnet sensor spaced apart from the driven magnet, the driven magnet sensor configured to sense rotation of the driven magnet and supply a driven magnet sensor output signal representative thereof; and
an output circuit coupled to receive the sensor output signal from the magnetic sensor and configured, upon receipt thereof, to determine one or both of (i) absolute angular position of the driven magnet and (ii) rotational speed of the driven magnet,
wherein the driver magnet is axially spaced from the driven magnet with a partial axial overlap between the driver magnet and the driven magnet such that a magnetic coupling between the driver magnet and the driven magnet is an axial coupling that is substantially parallel to the first rotational axis,
wherein the first rotational axis is different from the second rotational axis and the first rotational axis is radially spaced apart from the second rotational axis, such that the first rotational axis is not coaxially aligned with the second rotational axis,
wherein the driven magnet rotates one complete revolution each time the driver magnet rotates a predetermined number (N) of complete revolutions, $P2>P1$, and $N=(P2/P1)$.

11. The sensor of claim 10, wherein the driven magnet sensor comprises:
a driven sensor magnet spaced apart from, and coupled to, the driven magnet to rotate therewith; and
a magnetic sensor disposed adjacent to the driven sensor magnet, the magnetic sensor configured to sense rotation of the driven sensor magnet and, in response thereto, to supply the driven magnet sensor output signal.

12. The sensor of claim 10, further comprising:
a driver magnet sensor spaced apart from the driver magnet, the driver magnet sensor configured to sense rotation of the driver magnet and supply a driver magnet sensor output signal representative thereof.

13. The sensor of claim 12, wherein the output circuit is additionally coupled to receive the driver magnet sensor output signal and is further configured, upon receipt thereof, to determine the absolute angular position of the driver magnet.

14. The sensor of claim 12, wherein the driver magnet sensor comprises:
a driver sensor magnet spaced apart from, and coupled to, the driver magnet to rotate therewith; and
a magnetic sensor disposed adjacent to the driver sensor magnet, the magnetic sensor configured to sense rotation of the driver sensor magnet and, in response thereto, to supply the driver magnet sensor output signal.

15. The sensor of claim 10, further comprising:
a driver shaft coupled to the driver magnet and configured to rotate the driver magnet multiple complete rotations about the first rotational axis.

16. The sensor of claim 15, further comprising:
a driven shaft coupled to the driven magnet and configured to rotate, with the driven magnet, about the second rotational axis.

17. A multi-turn non-contact sensor, comprising:
a rotationally mounted driver shaft configured to selectively receive a rotational drive torque and, upon receipt of the drive torque, to rotate about a first rotational axis to a rotational position;
a rotationally mounted driven shaft spaced apart from the driver shaft and configured to rotate about a second rotational axis that is parallel to the first rotational axis;
a driver magnet mounted on the driver shaft to rotate therewith, the driver magnet having a first number (P1) of magnetic poles;
a driven magnet mounted on the driven shaft to rotate therewith, and coupled to receive a magnetic force from the driver magnet, the driven magnet having a second number (P2) of magnetic poles, the driven magnet responsive to rotation of the driver magnet to cause the driven shaft to rotate about the second rotational axis;

a driven magnet sensor spaced apart from the driven magnet, the driven magnet sensor configured to sense rotation of the driven magnet and supply a driven magnet sensor output signal representative thereof; and an output circuit coupled to receive the sensor output signal from the magnetic sensor and configured, upon receipt thereof, to determine one or both of (i) absolute angular position of the driven magnet and (ii) rotational speed of the driven magnet, wherein the driver magnet is axially spaced from the driven magnet with a partial axial overlap between the driver magnet and the driven magnet such that a magnetic coupling between the driver magnet and the driven magnet is an axial coupling that is substantially parallel to the first rotational axis, wherein the first rotational axis is different from the second rotational axis and the first rotational axis is radially spaced apart from the second rotational axis, such that the first rotational axis is not coaxially aligned with the second rotational axis, wherein the driven magnet rotates one complete revolution each time the driver magnet rotates a predetermined number (N) of complete revolutions, $P2>P1$, and $N=(P2/P1)$.

18. The sensor of claim 10, further comprising:

a driver magnet sensor spaced apart from the driver magnet, the driver magnet sensor configured to sense rotation of the driver magnet and supply a driver magnet sensor output signal representative thereof.

19. The sensor of claim 18, wherein the output circuit is additionally coupled to receive the driver magnet sensor output signal and is further configured, upon receipt thereof, to determine the absolute angular position of the driver magnet.

20. The sensor of claim 3, wherein the driven sensor magnet is centrally disposed along the second rotational axis.

* * * * *